United States Patent
Won et al.

(10) Patent No.: US 8,947,038 B2
(45) Date of Patent: Feb. 3, 2015

(54) POWER SUPPLY APPARATUS OF HOME APPLIANCE

(71) Applicant: Samsung Electronics Co., Ltd., Suwon-si (KR)

(72) Inventors: Jong Hun Won, Suwon (KR); Tae Hoon Lim, Daegu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 16 days.

(21) Appl. No.: 13/757,070

(22) Filed: Feb. 1, 2013

(65) Prior Publication Data

US 2013/0200829 A1   Aug. 8, 2013

(30) Foreign Application Priority Data

Feb. 3, 2012   (KR) .................. 10-2012-0011217

(51) Int. Cl.
*H02P 27/04* (2006.01)
*H02M 7/12* (2006.01)
*H02J 9/00* (2006.01)
*H02P 27/06* (2006.01)

(52) U.S. Cl.
CPC ............. *H02M 7/12* (2013.01); *H02J 9/005* (2013.01); *H02P 27/06* (2013.01)
USPC ............. 318/801; 318/803; 307/66; 307/43; 307/82

(58) Field of Classification Search
USPC ......... 363/20, 21, 72, 95, 97, 13; 318/400.17, 318/400.3, 801, 803; 323/267; 307/82, 83, 307/66, 80, 43, 44
See application file for complete search history.

(56) References Cited

U.S. PATENT DOCUMENTS

| | | | | |
|---|---|---|---|---|
| 3,564,337 | A * | 2/1971 | Macgeorge | 361/28 |
| 4,641,042 | A * | 2/1987 | Miyazawa | 307/66 |
| 5,703,764 | A * | 12/1997 | Hermann et al. | 363/21.16 |
| 5,995,388 | A * | 11/1999 | Preller | 363/21.15 |
| 6,057,609 | A * | 5/2000 | Nagai et al. | 307/66 |
| 6,272,030 | B1 * | 8/2001 | Oomura | 363/62 |
| 7,948,777 | B2 * | 5/2011 | Choi | 363/20 |
| 8,351,232 | B2 * | 1/2013 | Zhang | 363/89 |
| 2007/0109289 | A1 * | 5/2007 | Ting | 345/211 |
| 2007/0170900 | A1 * | 7/2007 | Lee | 323/260 |
| 2009/0027929 | A1 * | 1/2009 | Kim et al. | 363/65 |
| 2013/0169612 | A1 * | 7/2013 | Woo et al. | 345/211 |

* cited by examiner

*Primary Examiner* — Eduardo Colon Santana
*Assistant Examiner* — Bickey Dhakal
(74) *Attorney, Agent, or Firm* — Staas & Halsey LLP

(57) ABSTRACT

A power supply apparatus of a home appliance which meets standby power regulation of 0.5 watts using one SMPS. As compared with a general circuit which meets the standby power regulation using two or more SMPSs, it may be possible to curtail expenses required for addition of a separate standby only SMPS and miniaturize a PCB, resulting in a reduction in cost. Further, in a washing machine employing a motor, a circuit is provided to bypass a back EMF generated in the motor even if AC power is not supplied to the washing machine due to occurrence of a power failure or unplugging of the washing machine. Therefore, it may be possible to prevent a PCBA from being damaged due to the back EMF.

13 Claims, 2 Drawing Sheets

POWER SUPPLY APPARATUS OF HOME APPLIANCE

CROSS-REFERENCE TO RELATED APPLICATIONS

This application claims the priority benefit of Korean Patent Application No. 10-2012-0011217, filed on Feb. 3, 2012 in the Korean Intellectual Property Office, the disclosure of which is incorporated herein by reference.

BACKGROUND

1. Field

Example embodiments of the following disclosure relate to a power supply apparatus of a home appliance which meets standby power regulation using one switching mode power supply (SMPS).

2. Description of the Related Art

With rapid progress in analog and digital technologies, home appliances (for example, washing machines, refrigerators, air conditioners, etc.) having up-to-date functions have increasingly been adopted in homes and businesses.

Such an increase in the number of home appliances generally causes an increase in power consumption. When such a home appliance is plugged in, power is supplied through a power supply circuit including a switching mode power supply (SMPS) immediately when the home appliance is connected to an alternating current (AC) power source. As a result, power is always supplied to the home appliance irrespective of an operating state or standby state of the home appliance, resulting in continuous consumption of standby power even in the standby state.

Recently, measures for saving energy have gained great importance. Further, standby power regulation, which is an energy saving measure, has thus been tightened. In this regard, the home appliance has employed a standby only SMPS in order to meet standby power regulation of 0.5 watts. The standby only SMPS is designed, such that it is connected in parallel with an existing power supply circuit. That is, the standby-only SMPS is separately connected in addition to an SMPS for power supply, such that only the standby-only SMPS is connected to the AC power source in the standby state to construct a circuit for low power consumption.

Such a standby power reduction technology may meet the standby power regulation of 0.5 watts in that it uses a standby-only SMPS in addition to an SMPS for power supply. However, elements for implementation of the standby-only SMPS may be additionally provided, thereby increasing the size of a printed circuit board (PCB) and the cost of a printed circuit board assembly (PCBA).

SUMMARY

Therefore, it is an aspect of the present disclosure to provide a power supply apparatus of a home appliance which meets standby power regulation using one SMPS.

Additional aspects of the disclosure will be set forth in part in the description which follows and, in part, will be obvious from the description, or may be learned by practice of the disclosure.

In accordance with an aspect of the present disclosure, a power supply apparatus of a home appliance includes a power line to supply alternating current (AC) power from an AC power source, first and second rectifiers, each of the first and second rectifiers rectifying the AC power supplied through the power line, a main relay connected to an input of the first rectifier to switch the AC power to the first rectifier, a switching mode power supply (SMPS) connected to an output of the second rectifier to generate a direct current (DC) voltage for driving of the home appliance based on a rectified voltage from the second rectifier, and a load switch connected to an output of the SMPS to switch the DC voltage from the SMPS The power supply apparatus may further include a filter connected to the power line to remove a noise component of the AC power supplied through the power line.

The power supply apparatus may further include an inverter connected to an output of the first rectifier to convert a rectified voltage from the first rectifier into a 3-phase AC voltage and supply the converted 3-phase AC voltage to a motor, wherein the first rectifier may be connected between the AC power source and the inverter to rectify and smooth the AC power supplied through the power line to output a motor driving voltage.

The second rectifier may be connected between the AC power source and the SMPS to rectify and smooth the AC power supplied through the power line to output an SMPS driving voltage.

The power supply apparatus may further include a back electromotive force protection diode connected between a smoothing capacitor of the first rectifier and a smoothing capacitor of the second rectifier to bypass a back electromotive force generated in the motor.

The main relay may be connected between the AC power source and the first rectifier and be operated by the DC voltage generated by the SMPS.

The main relay and the load switch may be turned on/off in response to a home appliance operation signal or a home appliance operation stop signal.

The SMPS may supply main power for an operation of the home appliance or standby power for a standby mode of the home appliance in response to the home appliance operation signal or home appliance operation stop signal.

The power supply apparatus may further include a controller to control the main relay and the load switch in response to the home appliance operation signal or home appliance operation stop signal to turn on/off the main relay and the load switch.

The DC voltage generated by the SMPS may be used as a driving voltage to operate the controller and a load.

The load may include various sensors and electric components provided in the home appliance.

The load switch may include a plurality of load switches to switch the DC voltage from the SMPS to the load so as to meet standby power regulation.

The home appliance may include a variety of electronic products including a washing machine, a refrigerator, a microwave oven, a television and an air conditioner.

In accordance with another aspect of the present disclosure, a power supply apparatus of a home appliance includes a power line to supply alternating current (AC) power from an AC power source, third and fourth diodes, each of the third and fourth diodes rectifying the AC power supplied through the power line, a main relay connected to an input of the third diode to switch the AC power to the third diode, a switching mode power supply (SMPS) connected to an output of the fourth diode to generate a direct current (DC) voltage for driving of the home appliance based on a rectified voltage from the fourth diode, and a load switch connected to an output of the SMPS to switch the DC voltage from the SMPS.

The power supply apparatus may further include a filter connected to the power line to remove a noise component of the AC power supplied through the power line.

The power supply apparatus may further include an inverter connected to an output of the third diode to convert a rectified voltage from the third diode into a 3-phase AC voltage and supply the converted 3-phase AC voltage to a motor, wherein the third diode may be connected between the AC power source and the inverter to rectify the AC power supplied through the power line to output a motor driving voltage.

The fourth diode may be connected between the AC power source and the SMPS to rectify the AC power supplied through the power line to output an SMPS driving voltage.

The main relay may be connected between the AC power source and the third diode and be operated by the DC voltage generated by the SMPS.

In accordance with another aspect of the present disclosure, a power supply apparatus is provided, including: first and second rectifiers, each of the first and second rectifiers rectifying supplied AC power; a SMPS connected to an output of the second rectifier to generate a DC voltage based on a rectified voltage from the second rectifier; an inverter connected to an output of the first rectifier to convert a rectified voltage from the first rectifier into a 3-phase AC voltage and supply the converted 3-phase AC voltage to a motor; and a back electromotive force protection diode to bypass a back electromotive force generated in the motor.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
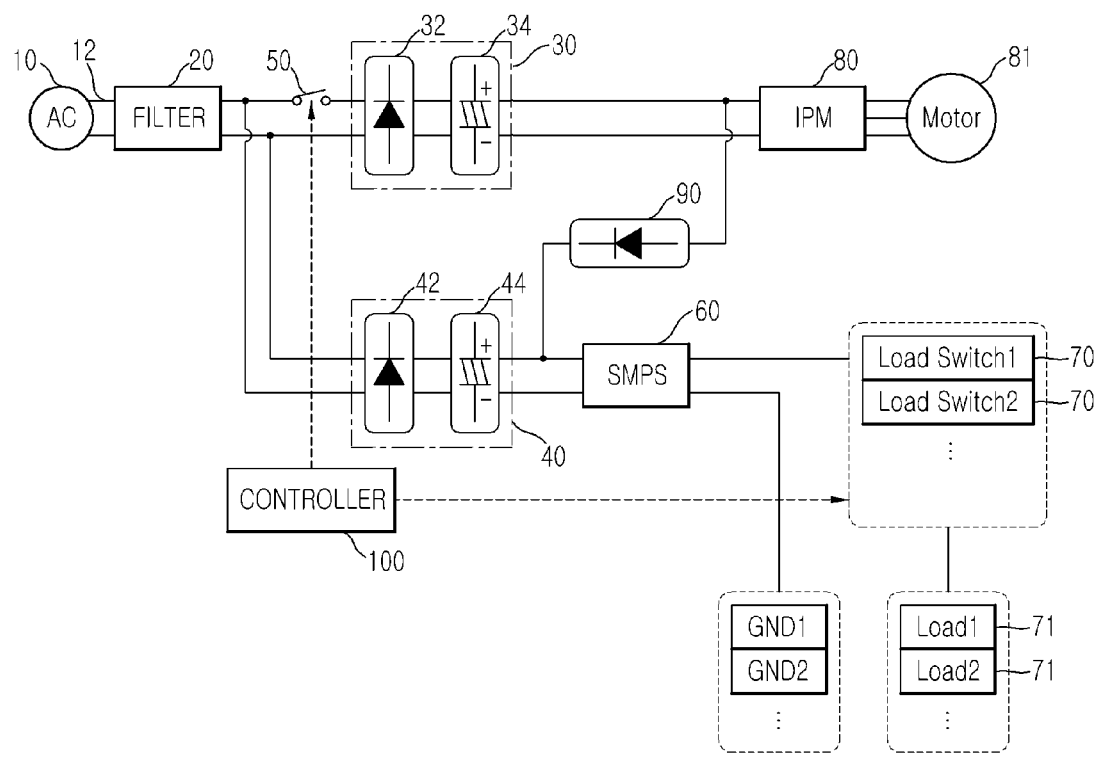
FIG. 1 is a circuit diagram of a power supply apparatus which is applied to a home appliance, according to an example embodiment of the present disclosure.

Reference will now be made in detail to the embodiments of the present disclosure, examples of which are illustrated in the accompanying drawings, wherein like reference numerals refer to like elements throughout.

FIG. 1 is a circuit diagram of a power supply apparatus which is applied to a home appliance, according to an example embodiment of the present disclosure.

In FIG. 1, the power supply apparatus of the home appliance, according to the present embodiment, includes a filter 20, first and second rectifiers 30 and 40 to rectify commercial alternating current (AC) power from a commercial AC power source 10, a main relay 50 to switch the AC power from the AC power source 10 to the first rectifier 30, a switching mode power supply (SMPS) 60 to generate stable direct current (DC) voltages of various levels, a plurality of load switches 70 to switch the DC voltages from the SMPS 60 to a plurality of loads 71, an inverter 80, and a back electromotive force protection diode 90. The filter 20 functions to remove a noise component of the AC power from the AC power source 10.

The filter 20 is an electromagnetic interference (EMI) filter which is connected to a power line 12 to remove a noise component of the AC power from the AC power source 10 supplied through the power line 12.

The first rectifier 30 may be a rectification circuit, which is connected between the AC power source 10 and the inverter 80 to output a motor driving voltage. The first rectifier 30 may include a first diode 32 to rectify the AC power from the AC power source 10 supplied through the power line 12, and a first smoothing capacitor 34 connected to the first diode 32 to smooth a rectified DC voltage from the first diode 32 and store electrical energy.

The second rectifier 40 may be a rectification circuit, which is connected between the AC power source 10 and the SMPS 60 to output an SMPS driving voltage. The second rectifier 40 may include a second diode 42 to rectify the AC power from the AC power source 10 supplied through the power line 12, and a second smoothing capacitor 44 connected to the second diode 42 to smooth a rectified DC voltage from the second diode 42 and store electrical energy.

On the other hand, each of the first diode 32 of the first rectifier 30 and the second diode 42 of the second rectifier 40 may be a rectifying element which typically includes four diodes wired in the form of a hybrid bridge to full-wave rectify the AC power from the AC power source 10.

Alternatively, in the power supply apparatus of the home appliance, according to the present embodiment, provided instead of each of the first diode 32 and second diode 42 may be four switching elements which are wired in the form of a hybrid bridge to full-wave rectify the AC power from the AC power source 10.

The main relay 50 may be connected between the AC power source 10 and the first rectifier 30 to switch the AC power from the AC power source 10 supplied through the power line 12 to the first rectifier 30.

The SMPS 60 may be connected to an output of the second rectifier 40 to output DC voltages desired by the user. This SMPS 60 may stably generate DC voltages of various levels, for example, a voltage of 3.3-5V, a voltage of 12V or 15V and a voltage of 20V. The generated DC voltages may be used as driving voltages to operate a controller 100, which will be described later, and various sensors and other electric components provided in the home appliance.

The load switches 70 may be connected to an output of the SMPS 60 to switch the DC voltages from the SMPS 60 to the loads (various sensors and electric components) 71 so as to meet standby power regulation.

The inverter 80 may convert a DC voltage output from the first smoothing capacitor 34 of the first rectifier 30 into a pulsed 3-phase AC voltage having a certain variable frequency and three phases U, V and W through pulse width modulation (PWM) and may output the converted 3-phase AC voltage to drive a motor 81. That is, depending on embodiments, the inverter 80 may be an intelligent power module (IPM) which includes six insulated gate bipolar transistors (IGBTs) and six fast recovery diodes (FRDs) wired in a 3-phase full bridge form to convert the DC voltage into the 3-phase AC voltage and supply the 3-phase AC voltage to the motor 81.

In general, the motor 81 may be a universal motor consisting of a field coil and an armature or a brushless DC (BLDC) motor consisting of a permanent magnet and an electromagnet.

The back electromotive force protection diode 90 may be connected between the first smoothing capacitor 34 of the first rectifier 30 and the second smoothing capacitor 44 of the second rectifier 40 to bypass a back electromotive force (EMF) which is generated in the motor 81 due to a capacitance difference between the first smoothing capacitor 34 and the second smoothing capacitor 44. This configuration may be provided so that power supply is performed until rotation of the motor 81 is stopped even when the AC power from the AC power source 10 is not supplied to the home appliance due to occurrence of a power failure, or the like.

In addition, the power supply apparatus of the home appliance, according to the present embodiment, may further include the controller 100 to drive the main relay 50 and the load switches 70.

The controller 100 may turn on/off the main relay 50 and the load switches 70 in response to an operation signal for operation of the home appliance or an operation stop signal.

Additionally, the controller 100 may include a main microcomputer for control of the operation of the home appliance, and a sub microcomputer for control of a standby mode of the home appliance.

Figure 2:
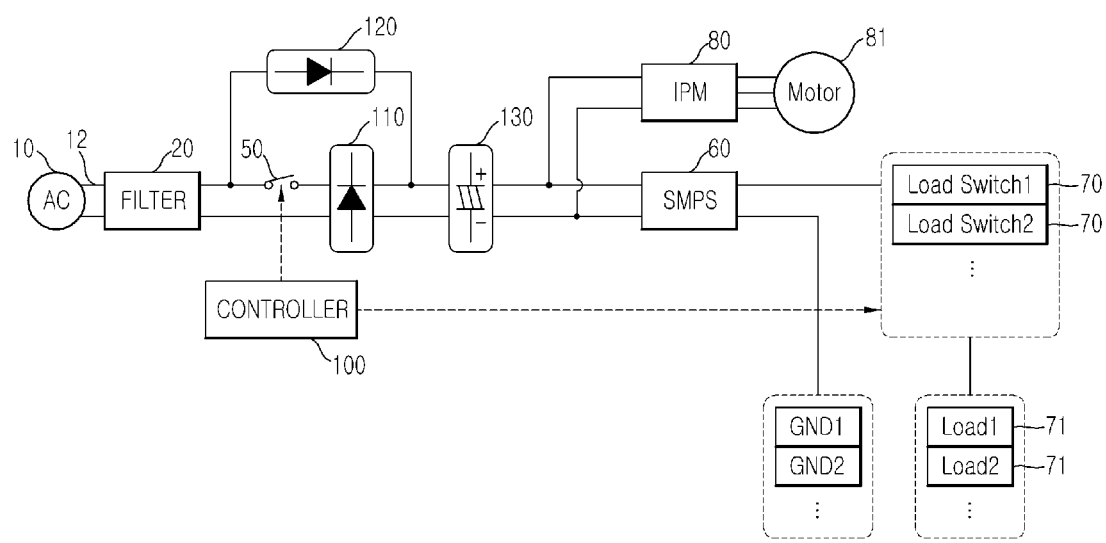
FIG. 2 is a circuit diagram of a power supply apparatus which is applied to a home appliance, according to another example embodiment of the present disclosure.

FIG. 2 is a circuit diagram of a power supply apparatus, which is applied to a home appliance, according to another example embodiment of the present disclosure, in which the same reference numerals and terms refer to the same elements as in FIG. 1.

In FIG. 2, the power supply apparatus of the home appliance, according to the present embodiment, may include a filter 20, third and fourth diodes 110 and 120 to rectify commercial AC power from a commercial AC power source 10, a smoothing capacitor 130 connected to the third and fourth diodes 110 and 120, a main relay 50 to switch the AC power from the AC power source 10 to the third diode 110, an SMPS 60 to generate stable DC voltages of various levels, a plurality of load switches 70 to switch the DC voltages from the SMPS 60 to a plurality of loads 71, and an inverter 80. The filter 20 may function to remove a noise component of the AC power from the AC power source 10.

The filter 20 may be an EMI filter, which is connected to a power line 12 to remove a noise component of the AC power from the AC power source 10 supplied through the power line 12.

The third diode 110 is a rectifying element, which may be connected between the AC power source 10 and the smoothing capacitor 130 to output a motor driving voltage. This third diode 110 may typically include four diodes wired in the form of a hybrid bridge to full-wave rectify the AC power from the AC power source 10 supplied through the power line 12.

The fourth diode 120 may be a rectifying element which is connected between the AC power source 10 and the smoothing capacitor 130 to output an SMPS driving voltage. This fourth diode 120 typically includes four diodes wired in the form of a hybrid bridge to full-wave rectify the AC power from the AC power source 10 supplied through the power line 12.

The smoothing capacitor 130 may be connected to the third and fourth diodes 110 and 120 to smooth rectified DC voltages from the third and fourth diodes 110 and 120 and store electrical energy.

Alternatively, in the power supply apparatus of the home appliance, according to the present embodiment, provided instead of each of the third diode 110 and fourth diode 120 may be four switching elements which are wired in the form of a hybrid bridge to full-wave rectify the AC power from the AC power source 10.

The main relay 50 may be connected between the AC power source 10 and the third diode 110 to switch the AC power from the AC power source 10 supplied through the power line 12 to the third diode 110.

The SMPS 60 may be connected to an output of the smoothing capacitor 130 to output DC voltages desired by the user. This SMPS 60 may stably generate DC voltages of various levels, for example, a voltage of 3.3-5V, a voltage of 12V or 15V and a voltage of 20V. The generated DC voltages may be used as driving voltages to operate a controller 100 to be described later, and to operate various sensors and other electric components provided in the home appliance.

That is, depending on embodiments, the controller 100 may be operated using the DC voltages of the SMPS. As another example, the controller 100 may be operated using an external power source.

The load switches 70 may be connected to an output of the SMPS 60 to switch the DC voltages from the SMPS 60 to the loads (various sensors and electric components provided in the home appliance) 71 so as to meet standby power regulation.

The inverter 80 may convert a DC voltage output from the smoothing capacitor 130 into a pulsed 3-phase AC voltage having a certain variable frequency and three phases U, V and W through PWM, and may output the converted 3-phase AC voltage to drive a motor 81. That is, depending on embodiments, the inverter 80 may be an IPM which includes six IGBTs and six FRDs wired in a 3-phase full bridge form to convert the DC voltage into the 3-phase AC voltage and supply the 3-phase AC voltage to the motor 81.

In general, the motor 81 may be a universal motor consisting of a field coil and an armature or a BLDC motor consisting of a permanent magnet and an electromagnet.

In addition, the power supply apparatus of the home appliance, according to the present embodiment, may further include the controller 100 to drive the main relay 50 and the load switches 70.

The controller 100 may turn on/off the main relay 50 and the load switches 70 in response to an operation signal for operation of the home appliance or an operation stop signal.

Further, the controller 100 may include a main microcomputer for control of the operation of the home appliance, and a sub microcomputer for control of a standby mode of the home appliance.

Hereinafter, the operation of the power supply apparatus of the home appliance, configured in the above manner, will be described.

FIG. 1 shows the circuit configuration of the power supply apparatus which is applied to the home appliance, according to an example embodiment of the present disclosure.

In FIG. 1, when the home appliance (for example, a washing machine employing an inverter motor) is plugged in, commercial AC power of, for example, 220V/60 Hz from the commercial AC power source 10 begins to be supplied to the home appliance through the power line 12.

The AC power from the AC power source 10 supplied through the power line 12 is applied to the filter 20 connected to the power line 12, which removes a noise component of the AC power. Then, the noise component-removed AC power is supplied to the first rectifier 30 and the second rectifier 40.

For example, depending on embodiments, the noise component-removed AC power is supplied to the second rectifier 40 which outputs the SMPS driving voltage, whereas, the noise component-removed AC power may not always be supplied to the first rectifier 30 which outputs the motor driving voltage. This is for meeting standby power regulation of 0.5 watts depending on an operating state or standby state of the home appliance.

At this time, in response to the operation signal for the operation of the home appliance or the operation stop signal, the controller 100 turns on/off the main relay 50 connected between the AC power source 10 and the first rectifier 30 to supply or block the AC power from the AC power source 10 to the first rectifier 30 through the main relay 50.

Then, in the first rectifier 30 and the second rectifier 40, each of the first diode 32 and the second diode 42 rectifies the AC power from the AC power source 10 supplied through the power line 12. Further, the first smoothing capacitor 34 and the second smoothing capacitor 44, connected respectively to the first diode 32 and second diode 42, smooth the rectified DC voltages from the first diode 32 and the second diode 42, respectively.

For example, the DC voltage of about 300V output from the first rectifier 30 is used as the motor driving voltage for driving of the motor (for example, an inverter motor) 81, and the DC voltage output from the second rectifier 40 is used as the SMPS driving voltage required for the SMPS 60 to generate stable voltages of various levels.

Then, the inverter 80 converts the DC voltage of about 300V output from the first rectifier 30 into a 3-phase AC voltage having a certain variable frequency through the PWM and supplies the converted 3-phase AC voltage to the motor 81, thereby causing the motor 81 to begin to be driven.

In addition, the SMPS 60 receives the DC voltage output from the second rectifier 40 and generates stable DC voltages of various levels, for example, a voltage of 3.3-5V, a voltage of 12V or 15V and a voltage of 20V. The DC voltages generated by the SMPS 60 are used as driving voltages to operate the controller 100, and various sensors and other electric components provided in the home appliance.

In the power supply apparatus of the home appliance according to an example embodiment of the present disclosure, the load switches 70 are connected to the output of the SMPS 60 to switch the DC voltages from the SMPS 60 to the loads (various sensors and electric components provided in the home appliance) 71 so as to meet standby power regulation.

In addition, in the power supply apparatus of the home appliance according to an example embodiment of the present disclosure, the controller 100 controls a back EMF which may be generated during driving of the motor 81 due to a capacitance difference between the first smoothing capacitor 34 of the first rectifier 30 and the second smoothing capacitor 44 of the second rectifier 40. However, when the AC power from the AC power source 10 is not supplied to the home appliance due to the occurrence of a power failure or unplugging of the home appliance during the operation of the home appliance, in which the loads 71 are driven by the DC voltages from the SMPS 60 and the motor 81 is driven by the 3-phase AC voltage from the inverter 80, the controller 100 may fall into an unstable state (off state).

Provided that the controller 100 falls into the unstable state, it will fail to control the back EMF. In this case, the back electromotive force protection diode 90, connected between the first smoothing capacitor 34 of the first rectifier 30 and the second smoothing capacitor 44 of the second rectifier 40, bypasses the back EMF, thereby enabling power supply to be performed until rotation of the motor 81 is stopped even when the AC power from the AC power source 10 is not supplied to the home appliance due to power failure or unplugging of the home appliance.

FIG. 2 shows the circuit configuration of the power supply apparatus which is applied to the home appliance, according to another example embodiment of the present disclosure.

In FIG. 2, when the home appliance (for example, a washing machine employing an inverter motor) is plugged in, commercial AC power of, for example, 220V/60 Hz from the commercial AC power source 10 begins to be supplied to the home appliance through the power line 12.

The AC power from the AC power source 10 supplied through the power line 12 is applied to the filter 20 connected to the power line 12, which removes a noise component of the AC power. Then, the noise component-removed AC power is supplied to the third diode 110 and the fourth diode 120.

For example, depending on embodiments, the noise component-removed AC power is always supplied to the fourth diode 120 which outputs the SMPS driving voltage, whereas, the noise component-removed AC power is not always supplied to the third diode 110 which outputs the motor driving voltage. For instance, when the main relay 50 is open, then the noise component-removed AC power is not supplied to the third diode 110. This is for meeting standby power regulation of 0.5 watts depending on an operating state or standby state of the home appliance.

At this time, in response to the operation signal for the operation of the home appliance or the operation stop signal, the controller 100 turns on/off the main relay 50 connected between the AC power source 10 and the third diode 110 to supply or block the AC power from the AC power source 10 to the third diode 110 through the main relay 50.

Then, each of the third and fourth diodes 110 and 120 rectifies the AC power from the AC power source 10 supplied through the power line 12. Further, the smoothing capacitor 130, connected to the third and fourth diodes 110 and 120, smoothes the rectified DC voltages from the third and fourth diodes 110 and 120.

For example, the DC voltage of about 300V output from the third diode 110 is used as the motor driving voltage for driving of the motor (for example, an inverter motor) 81, and the DC voltage output from the fourth diode 120 is used as the SMPS driving voltage required for the SMPS 60 to generate stable voltages of various levels.

Then, the inverter 80 converts the DC voltage of about 300V output from the third diode 110 into a 3-phase AC voltage having a certain variable frequency through the PWM and supplies the converted 3-phase AC voltage to the motor 81, thereby causing the motor 81 to begin to be driven.

In addition, the SMPS 60 receives the DC voltage output from the fourth diode 120 and generates stable DC voltages of various levels, for example, a voltage of 3.3-5V, a voltage of 12V or 15V and a voltage of 20V. The DC voltages generated by the SMPS 60 are used as driving voltages to operate the controller 100, and various sensors and other electric components provided in the home appliance.

In the power supply apparatus of the home appliance, according to another example embodiment of the present disclosure, the load switches 70 are connected to the output of the SMPS 60 to switch the DC voltages from the SMPS 60 to the loads (various sensors and electric components provided in the home appliance) 71 so as to meet standby power regulation.

As is apparent from the above description, a proposed power supply apparatus of a home appliance meets standby power regulation of 0.5 watts using one SMPS. Therefore, as compared with a general circuit which meets the standby power regulation using two or more SMPSs, it may be possible to curtail expenses required for addition of a separate standby-only SMPS and miniaturize a printed circuit board (PCB), resulting in a reduction of cost. Further, in a washing machine employing a motor, for example, a circuit is provided to bypass a back EMF generated in the motor even if AC power is not supplied to the washing machine due to the occurrence of a power failure or unplugging of the washing machine. Therefore, it may be possible to prevent a printed circuit board assembly (PCBA) from being damaged due to the back EMF.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A power supply apparatus of a home appliance, comprising:
- a power line to supply alternating current (AC) power from an AC power source;
- first and second rectifiers, each of the first and second rectifiers rectifying the supplied AC power;
- a main relay connected to an input of the first rectifier to switch the AC power to the first rectifier;
- a switching mode power supply (SMPS) connected to an output of the second rectifier to generate a direct current (DC) voltage for driving the home appliance based on a rectified voltage from the second rectifier;
- a load switch connected to an output of the SMPS to switch the DC voltage from the SMPS; and
- a back electromotive force protection diode connected between a smoothing capacitor of the first rectifier and a smoothing capacitor of the second rectifier, and
    - wherein the back electromotive force protection diode is configured to bypass a back electromotive force generated in the motor.

2. The power supply apparatus according to claim 1, further comprising a filter connected to the power line to remove a noise component of the AC power supplied through the power line.

3. The power supply apparatus according to claim 1, further comprising an inverter connected to an output of the first rectifier to convert a rectified voltage from the first rectifier into a 3-phase AC voltage and supply the converted 3-phase AC voltage to a motor,
- wherein the first rectifier is connected between the AC power source and the inverter to rectify and smooth the AC power supplied through the power line to output a motor driving voltage.

4. The power supply apparatus according to claim 1, wherein the main relay is connected between the AC power source and the first rectifier, and
- wherein the main relay is operated by the DC voltage generated by the SMPS.

5. The power supply apparatus according to claim 1, wherein the home appliance comprises at least one of a washing machine, a refrigerator, a microwave oven, a television, and an air conditioner.

6. The power supply apparatus according to claim 3, wherein the second rectifier is connected between the AC power source and the SMPS to rectify and smooth the AC power supplied through the power line to output an SMPS driving voltage.

7. The power supply apparatus according to claim 4, wherein the main relay and the load switch are turned on/off in response to a home appliance operation signal or a home appliance operation stop signal.

8. The power supply apparatus according to claim 7, wherein the SMPS supplies main power for an operation of the home appliance or standby power for a standby mode of the home appliance in response to the home appliance operation signal or home appliance operation stop signal, respectively.

9. The power supply apparatus according to claim 7, further comprising a controller to control the main relay and the load switch in response to the home appliance operation signal or home appliance operation stop signal by turning on/off the main relay and the load switch.

10. The power supply apparatus according to claim 9, wherein the DC voltage generated by the SMPS is used as a driving voltage to drive the controller and a load.

11. The power supply apparatus according to claim 10, wherein the load comprises at least one sensor and at least one electric component provided in the home appliance.

12. The power supply apparatus according to claim 11, wherein the load switch comprises a plurality of load switches to switch the DC voltage from the SMPS to the load so as to meet standby power regulation.

13. A power supply apparatus, comprising:
- first and second rectifiers, each of the first and second rectifiers rectifying supplied AC power;
- a switching mode power supply (SMPS) connected to an output of the second rectifier to generate a direct current (DC) voltage based on a rectified voltage from the second rectifier;
- an inverter connected to an output of the first rectifier to convert a rectified voltage from the first rectifier into a 3-phase AC voltage and supply the converted 3-phase AC voltage to a motor; and
- a back electromotive force protection diode connected between a smoothing capacitor of the first rectifier and a smoothing capacitor of the second rectifier to bypass a back electromotive force generated in the motor.

* * * * *